United States Patent
Miglani et al.

(10) Patent No.: US 8,929,696 B1
(45) Date of Patent: Jan. 6, 2015

(54) COMPOUND OPTICAL CIRCUIT SWITCH WITH SHARED OPTICAL POWER MEASUREMENTS

(71) Applicant: CALIENT Technologies, Inc., Goleta, CA (US)

(72) Inventors: Jitender Miglani, Hollis, NH (US); Mike Deacon, Ventura, CA (US); Vijayan Thattai, Goleta, CA (US)

(73) Assignee: Calient Technologies, Inc., Goleta, CA (US)

( * ) Notice: Subject to any disclaimer, the term of this patent is extended or adjusted under 35 U.S.C. 154(b) by 0 days.

(21) Appl. No.: 14/047,728

(22) Filed: Oct. 7, 2013

Related U.S. Application Data

(63) Continuation-in-part of application No. 14/046,825, filed on Oct. 4, 2013.

(51) Int. Cl.
*G02B 6/35* (2006.01)

(52) U.S. Cl.
CPC .................................... *G02B 6/3518* (2013.01)
USPC ............................................... 385/18; 385/17

(58) Field of Classification Search
USPC ........................................................... 385/18
See application file for complete search history.

(56) References Cited

U.S. PATENT DOCUMENTS

| | | | |
|---|---|---|---|
| 5,037,173 | A | 8/1991 | Sampsell et al. |
| 6,097,860 | A | 8/2000 | Laor |
| 6,411,751 | B1 | 6/2002 | Giles et al. |
| 6,456,751 | B1 | 9/2002 | Bowers et al. |
| 6,567,574 | B1 | 5/2003 | Ma et al. |
| 6,628,041 | B2 | 9/2003 | Lee et al. |
| 6,690,885 | B1 | 2/2004 | Aksyuk et al. |
| 6,798,992 | B1 | 9/2004 | Bishop et al. |
| 6,819,815 | B1 | 11/2004 | Corbalis et al. |
| 6,823,101 | B2 | 11/2004 | Gates, II et al. |
| 6,836,381 | B2 | 12/2004 | Giles et al. |
| 7,676,125 | B2 | 3/2010 | Zheng et al. |
| 2005/0286891 | A1 | 12/2005 | Sakai et al. |
| 2010/0020378 | A1 | 1/2010 | Yamaguchi et al. |

Primary Examiner — Omar R Rojas
(74) Attorney, Agent, or Firm — SoCal IP Law Group LLP; John E. Gunther; Steven C. Sereboff

(57) ABSTRACT

Compound optical circuit switches and methods are disclosed. Two or more $1^{st}$-tier switches may be configured to make selectable optical connections between a plurality of $1^{st}$-tier inputs and a plurality of $1^{st}$-tier outputs. Each $1^{st}$-tier switch may include input and output power meters to measure optical powers of signals received at the $1^{st}$-tier inputs and optical powers of signals output from the $1^{st}$-tier outputs, respectively. At least one $2^{nd}$-tier switch may include plural $2^{nd}$-tier inputs optically connected to respective $1^{st}$-tier outputs, plural $2^{nd}$-tier outputs optically connected to respective $1^{st}$-tier inputs, and plural $2^{nd}$-tier rotatable mirror elements to make selectable optical connections from the $2^{nd}$-tier inputs to the $2^{nd}$-tier outputs. A $2^{nd}$-tier switch controller may control positions of at least some of the 2nd-tier mirror elements based on optical power measurement data from the input power meters and the output power meters of the $1^{st}$-tier switches.

19 Claims, 11 Drawing Sheets

US 8,929,696 B1

COMPOUND OPTICAL CIRCUIT SWITCH WITH SHARED OPTICAL POWER MEASUREMENTS

RELATED APPLICATION INFORMATION

This patent is a continuation-in-part of prior-filed copending non-provisional patent application Ser. No. 14/046,825, filed Oct. 4, 2013, entitled COMPOUND OPTICAL CIRCUIT SWITCH.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical communications networks and more particularly to optical circuit switches using MEMS (micro-electromechanical system) mirror arrays.

2. Description of the Related Art

Communications networks commonly contain a mesh of transmission paths which intersect at hubs or nodes. At least some of the nodes may include a switching device that receives data or information arriving at the node and retransmits the information along appropriate outgoing paths.

Optical fiber links are commonly used to provide high bandwidth transmission paths between nodes. Such optical fiber links form the backbone of wide area networks such as the Internet. Optical fiber links are also applied in high bandwidth local area networks which may be used, for example, to connect server racks in large data centers or to connect processors in high performance computers.

An optical circuit switch is a switching device that forms connections between pairs of optical fiber communications paths. A typical optical circuit switch may have a plurality of ports and be capable of selectively connecting any port to any other port in pairs. Since an optical circuit switch does not convert information flowing over the optical fiber communication paths to electrical signals, the bandwidth of an optical circuit switch is essentially the same as the bandwidth of the optical communications paths. Further, since an optical circuit switch does not convert information into electrical signals, the power consumption of an optical circuit switch may be substantially lower than a comparable conventional (i.e. electronic) switch.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
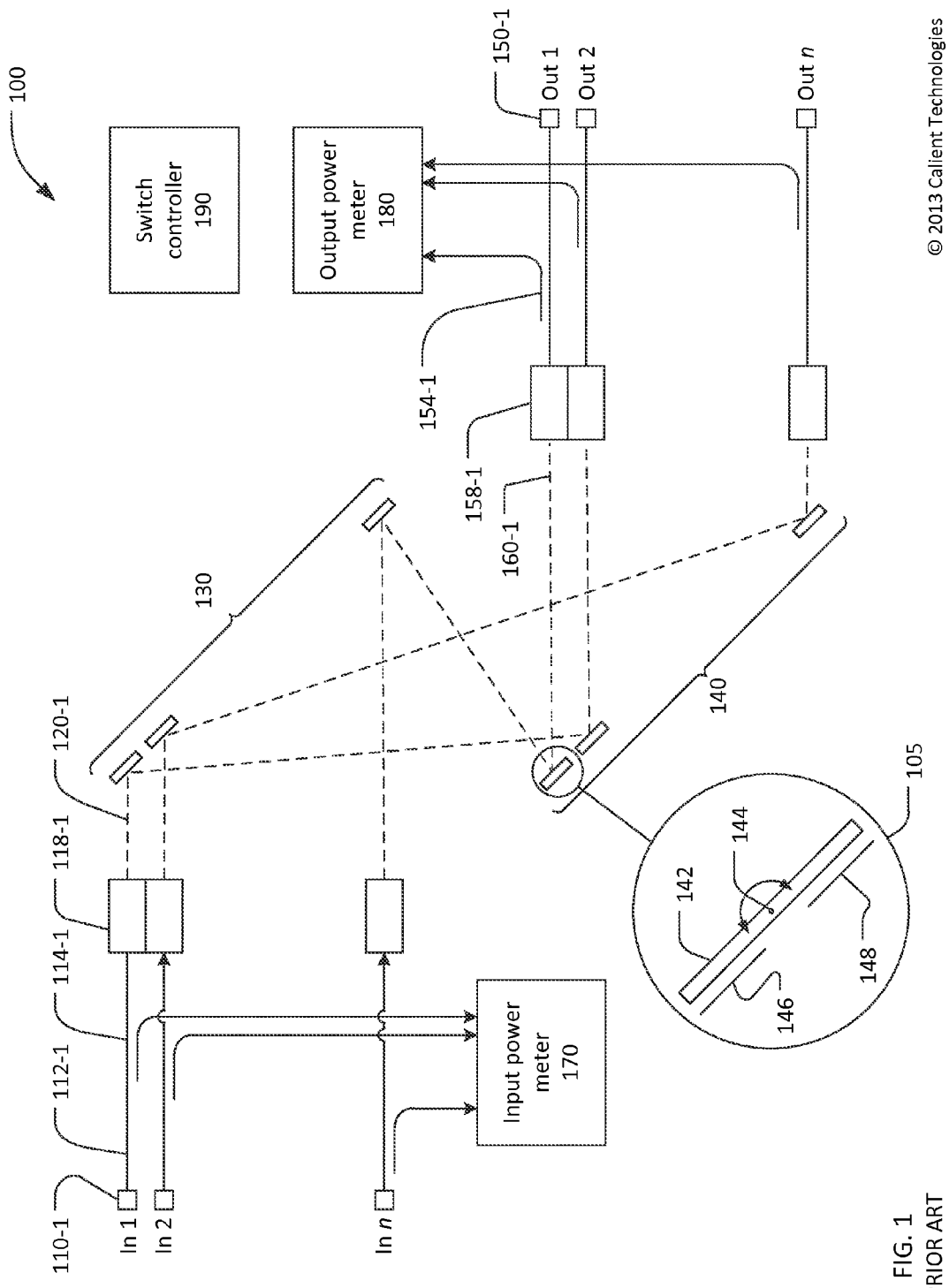
FIG. 1 is an optical schematic diagram of an optical circuit switch.

Referring now to FIG. 1, an exemplary optical circuit switch 100 may be configured to connect a group of n inputs (where n is an integer greater than 1), labeled In 1 to In n, to a group of n outputs, labeled Out 1 to Out n. More specifically, the optical circuit switch 100 may selectively connect up to n pairs of inputs and outputs.

Each of the inputs In 1 to In n may include a connector (of which only the connector 110-1 is identified) to receive an input optical signal from a optical fiber cable (not shown) external to the optical circuit switch. Each connector may be coupled by a respective optical fiber (of which only optical fiber 112-1 is identified) to a respective tap coupler (of which only tap coupler 114-1 is identified). Each tap coupler may extract an input sample portion, for example 1% to 10%, of the input optical signal from the respective optical fiber. Each input sample portion may be directed to an input power meter 170. The remainder of the input optical signals, other than the input sample portions, may be conveyed by respective optical fibers to respective collimator lenses (of which only collimator lens 118-1 is identified). Each collimator lens may convert the input optical signal from the respective optical fiber into a collimated input optical beam (of which only input optical beam 120-1 is identified) in free space. Free space optical beams are shown in FIG. 1 as dashed lines.

Each input optical beam, such as input optical beam 120-1, may be directed onto a first mirror array 130. The first mirror array 130 may include n mirrors with a one-to-one correspondence between input optical beams and mirrors, such that each input optical beam is directed onto a respective mirror. To improve the manufacturing yield of the first mirror array, the first mirror array 130 may include more than n mirrors, in which case the n input optical beams may be directed to a subset of n mirrors that are known to be fully functional. Since each of the n input optical beams originates from a specific port and is directed onto a specific mirror, each port may be described as "uniquely associated" with a corresponding mirror. In this patent, "uniquely associated" means a one-to-one correspondence. To take advantage of the available fully functional mirrors, the associations between ports and mirrors may be different in different optical circuit switches Each mirror on the first mirror array 130 may reflect the respective input optical beam to a selected mirror of a second mirror array 140. The mirrors of the second mirror array 140 may reflect the incident beam to form a respective output optical beam (of which only output optical beam 160-1 is identified). Each output optical beam may be directed to a corresponding focusing lens (of which only focusing lens 158-1 is identified). Each focusing lens may focus the respective output optical beam into an output optical signal in a respective optical fiber. Each output optical signal may be conveyed to a respective output tap coupler (of which only output tap coupler 154-1 is identified). Each output tap coupler may direct a sample portion (for example 1% to 10%) of the respective output optical signal to an output power meter 180. The remainder of each output optical signal, other than the respective sample portion, may be conveyed to a respective output connector (of which only connector 150-1 is identified).

The input power meter 170 and the output power meter 180 may measure the optical power in each of the input sample portions and output sample portions, respectively. Each of the input power meter 170 and the output power meter 180 may include an optical power detector for each sample portion. Alternatively, each of the input power meter 170 and the output power meter 180 may time-multiplex a single detector or an array of detectors such that each detector measures the optical power of a sequence of sample portions. For example, each of the input power meter 170 and the output power meter 180 may use a scanning mirror to direct sample portions to a single detector or an array of detectors as described in U.S. Pat. No. 7,676,125. The input power meter 170 and the output power meter 180 may be a common module.

Sample portions may be extracted from the input signal and output signals using tap couplers (e.g. tap couplers 114-1 and 154-1) as previously described. Alternatively, sample portions may be extracted from the input optical beams, such as input optical beam 120-1, and/or the output optical beams, such as output optical beam 160-1, using one or more free space sampling optical elements. For example, sample portions may be extracted as described in U.S. Pat. No. 6,597,825 or U.S. Pat. No. 6,668,118. Input tap couplers, such as input tap coupler 114-1 and/or output tap couplers, such as output tap coupler 154-1, may not be present when free-space sampling optical elements are used to extract sample portions.

The optical circuit switch 110 may include a switch controller 190. The switch controller 190 may control the mirror elements in the first mirror array 130 and the second mirror array 140 to make desired optical connections between the input In 1 to In n and the outputs Out 1 to Out n. For example, as shown in FIG. 1, input In 1 is connected to output Out 2, input In 2 is connected to output Out n, and input In n is connected to output Out 1. The switch controller 190 will be discussed in greater detail subsequently.

The detail view 115 shows a simplified schematic diagram of a mirror element from either the first mirror array 130 or the second mirror array 140. A reflective mirror element 142 is supported by a pair of torsion bars, of which only a first torsion bar 144 is visible. The second torsion bar is located on the far side of the mirror element 142 and axially aligned with the first torsion bar 144. The mirror element 142 may rotate about the axis of the torsions bars, with the torsion bars providing a spring force tending to return the mirror element 142 to a default position. The mirror element 142 may be coupled to a first electrode 146 and a second electrode 148. The mirror element 142 may be rotated by electrostatic attraction between the mirror element and either the first electrode 146 or the second electrode 148.

For example, applying a voltage between the first electrode 146 and the mirror element 142 will create an attraction between the mirror element and the first electrode, causing the mirror element to rotate in a counter-clockwise direction. The mirror will rotate until the return force of the torsion bars is equal to the force of the electrostatic attraction. The angular rotation of the mirror element 142 may be approximately proportional to the square of the voltage between the first electrode 146 and the mirror element 142. Similarly, applying a voltage between the second electrode 148 and the mirror element 142 will cause the mirror to rotate in a clockwise direction. The first electrode 146 and the second electrode may be "dedicated" to the mirror element 142, which is to say the only function of the electrodes 146 and 148 is to rotate the mirror element 142 and the voltages applied to the electrodes 146 and 148 have no effect on any mirror element other than the mirror element 142.

In the simplified example of FIG. 1, the mirror element 142 rotates about a single axis defined by the torsion bars 144. Either or both of the first mirror array 130 and the second mirror array 140 may include mirrors configured to independently rotate about two orthogonal axes. In this case, each mirror element may be coupled to a first pair of electrodes to cause clockwise and counter-clockwise rotation about a first axis and a second pair of electrodes to cause clockwise and counter-clockwise rotation about a second axis orthogonal to the first axis. The structure of a mirror array and the associated electrodes may be substantially more complex than that shown in the simplified schematic detail view 115. For example, U.S. Pat. No. 6,628,041 describes a MEMS mirror array having two-axis mirror motion and comb actuators.

Figure 2:
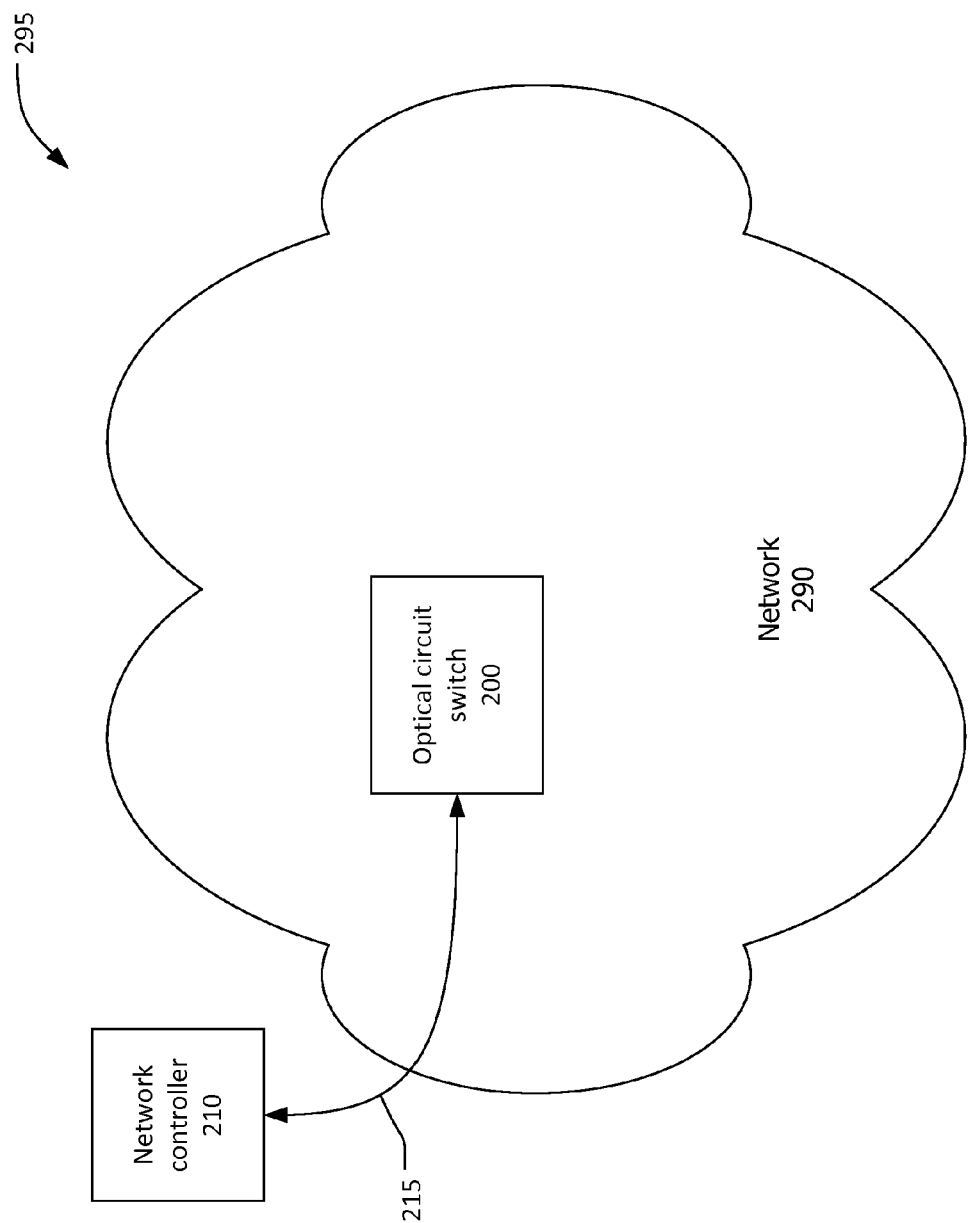
FIG. 2 is a block diagram of an environment for an optical circuit switch.

Referring now to FIG. 2, an environment 295 for the application of an optical circuit switch 200 may include a network 290 and a network controller 210. The optical circuit switch 200 may be the optical circuit switch 110 or may be a compound optical circuit switch including multiple copies of the optical circuit switch 110. When the optical circuit switch 200 is a compound optical circuit switch, the multiple copies of the optical circuit switch 110 may be collocated or distributed. The optical circuit switch 200 may be disposed within the network 290 and may function to switch optical connections between other nodes (not shown) within the network 290. The network 290 may be, for example, a wide area network, a local area network, a storage area network, a private network within a data center or computer cluster, and may be or include the Internet. While the connections switched by the optical circuit switch 200 are optical, other connections within the network 290 may be wired and/or wireless.

The network controller 210 may be a computing device that provides a graphic user interface or a command line interface for a network operator to enter connection commands (i.e. commands to make or break one or more optical connections) for the optical circuit switch 200. The network controller 210 may be a computing device running network management software, in which case connection commands for the optical circuit switch 200 may be generated automatically by the network controller 210.

A communications link 215 between the optical circuit switch 200 and the network controller 210 may be in-band, which is to say the communications link 215 may be a path within the network 290. In this case, the optical circuit switch may have a wired, wireless, or optical connection to the network in addition to the optical connections being switched. The communications link 215 may be out-of-band, which is to say the communications link 215 may be a dedicated connection or a connection via a command network independent from the network 290. A configuration in which the network controller 210 executes network management software to automatically provide connection commands to the optical circuit switch 200 via an out-of-band communications link 215 is an example of what is commonly called a "software defined network".

Figure 3:
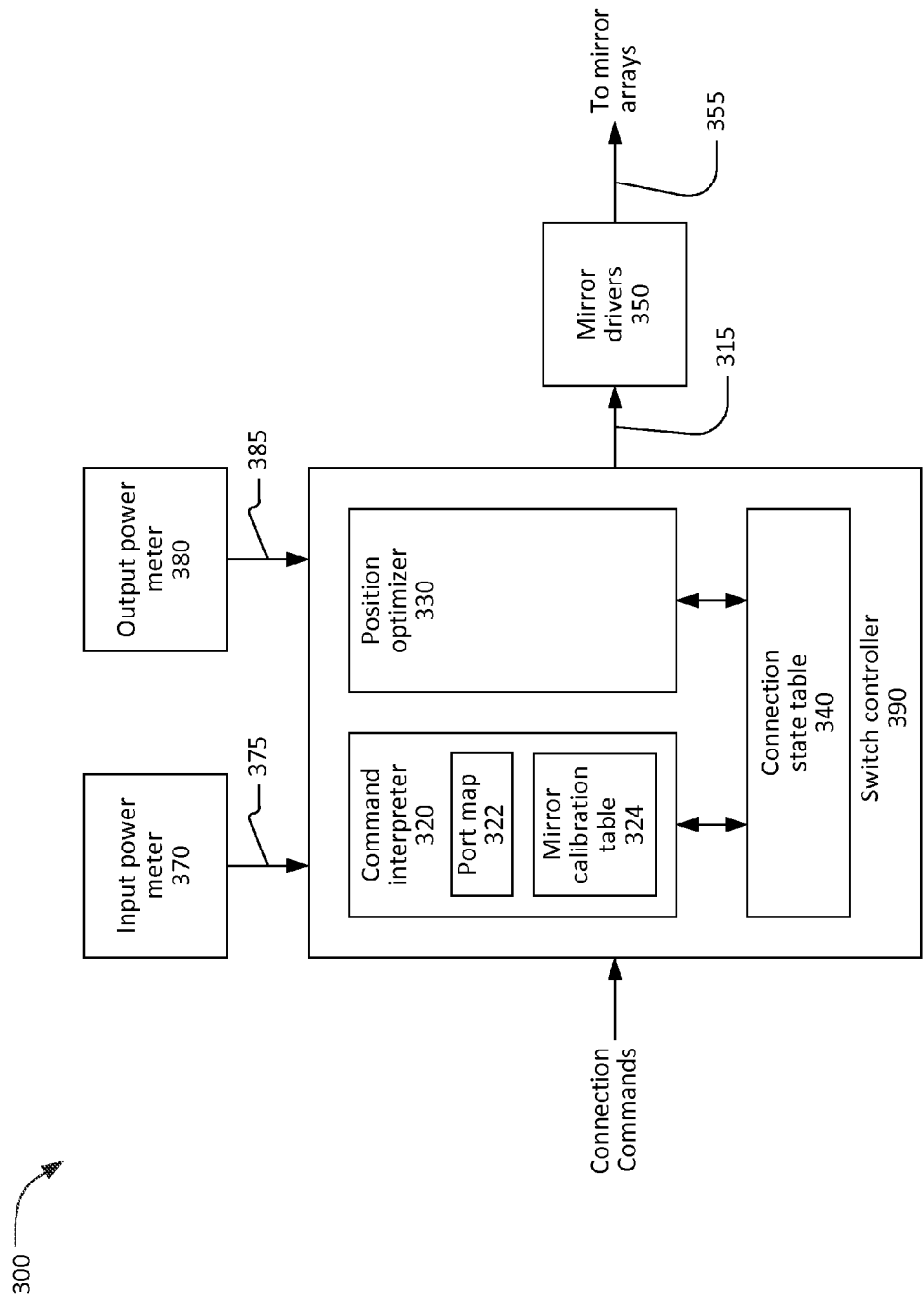
FIG. 3 is a block diagram of an optical circuit switch.

FIG. 3 is a high-level block diagram of the control and mirror driver portions of an optical circuit switch 300, which may be the optical circuit switch 110. The optical circuit switch 300 may include a switch controller 390, an input power meter 370, an output power meter 380, and a plurality of mirror driver circuits 350. The optical circuit switch 300 may include one mirror driver circuit 350 for each mirror in two mirror arrays if the individual mirror elements are rotatable about a single axis. The optical circuit switch 300 may include two mirror driver circuits 350 for each mirror in the mirror arrays if the individual mirror elements are rotatable about two orthogonal axes. Each mirror driver circuit 350 may have, for example, two selectable outputs to drive one or the other of a pair of electrodes, as described in pending patent application Ser. No. 13/787,621.

The switch controller 390, which may be the switch controller 190, may include a command interpreter 320 and a position optimizer 330 which jointly maintain a connection state table 340. The switch controller 390 may receive connection commands from an external source such as the network controller 210. The switch controller 390 may receive connection commands from some other source or in some other manner.

The command interpreter 320 may be responsive to a set of connection commands received by the switch controller 390. The set of connection commands may include, for example "Break a-b" and "Make a-b". These commands may respectively instruct the optical circuit switch 300 to either break an existing connection between ports a and b (where a is an integer input number and b is an integer output number), or to make a new connection between ports a and b. The set of connection commands may include a mass connection command, which may list multiple connections to be made. The mass connection command may be used, for example, when the optical circuit switch is initially integrated into a network or when substantial reconfiguration of the network or data center is required.

The command interpreter 320 may include or have access to a port map 322. As previously described, to allow the use of mirror arrays with a small number of nonoperational mirror elements, the number of mirror elements in each mirror array may be larger than the number of inputs or outputs. Each input and output may be coupled to a known operational mirror element in the respective mirror array. The port map 322 may be a table containing data relating each input to a mirror element in a first mirror array, and data relating each output to a mirror element in a second mirror array. The data in the port map 322 may be specific to the particular first and second mirror arrays used in the optical circuit switch 300.

There may be some performance variation from mirror element to mirror element and/or from mirror array to mirror array. In particular, there may be some variation in the mirror element rotation angle versus applied voltage characteristics within and between mirror arrays. The command interpreter 320 may include or have access to a mirror calibration table 324 which contains data describing the performance of each mirror element. For example, the mirror calibration table 324 may store the rotation angle versus voltage characteristic of each mirror element. The mirror calibration table 324 may store, for all possible pairs of input and output mirror elements, a set of voltages that, when applied to the appropriate electrodes, will cause the mirror elements to rotate to make the desired connection. The data in the mirror calibration table 324 may be specific to the particular mirror arrays used in the optical circuit switch 300. The data in the mirror calibration table 324 may be derived, for example, from the results of tests performed on the particular mirror arrays used in the optical circuit switch 300.

The data stored in the mirror calibration table 324 may indicate nominal voltages required to initially make desired connections through the optical circuit switch 300. However, once voltages are applied to electrodes associated with a pair of input and output mirror elements to initially make a connection, the positions of the mirror elements may drift over time. The result of mirror element drift may be failure or degradation (e.g. increased insertion loss) of the connection. The mirror arrays used in the optical circuit switch 300 may be fabricated by chemical micromachining of a silicon substrate. For example, each mirror element may consist of a reflective coating on a silicon slab that is connected to the silicon substrate by narrow silicon elements that function as torsion bars. Each silicon mirror slab may be free to rotate about the axis or axes defined by the torsion bars. Mirror element drift may be due to mechanical stress relief of the torsion bars over time. Further, all or portions of the silicon surfaces of the mirror array may be coated with SiO2 or some other dielectric. Electric charge trapped at defects in the insulators layers may contribute to mirror element drift over time. Other causes may also contribute to mirror element drift.

The position optimizer 330 may receive data from the input power meter 370 and the output power meter 380 indicating measured power values of sample portions extracted from the input signals and the output signals of the optical circuit switch, respectively. The power levels of the input signals and the output signals may be inferred from the measured power of the respective sample portions. The position optimizer 330 may determine the insertion loss of each active optical connection (i.e. each optical connection where light is present) from the respective input signal and output signal power levels. The position optimizer 330 may periodically adjust the positions of some or all of the mirror elements to minimize the insertion loss of each optical connection. For example, to optimize a connection, the position optimizer 330 may make incremental changes in the position of one of the mirror elements used in the connection and observe the resulting effect on insertion loss. The optimum position of the mirror element may then be found using a hill climbing algorithm or a similar algorithm. The position of each mirror element may be optimized periodically. The time interval between successive optimizations of each mirror element may be short (on the order of seconds) compared to the time constant of the mirror element drift (on the order of hours). Periodic optimization of the position of each mirror element may automatically compensate for mirror element drift.

The command interpreter 320 and the position optimizer 330 may jointly maintain and share the connection state table 340. The connection state table 340 may include data indicative of the state or status of each port of the optical circuit switch 300. Data included in the connection state table 340 for each port may include a first flag indicating if the respective port is available or committed to a connection, and a second flag indicating if the connection has actually been made. The connection state table 340 may include, for inputs, a third flag indicating is light is present at the respective input. For each port that is committed to a connection, the connection state table 340 may also include the identity of the port at the other end of the connection, the mirror element associated with the port, the voltages presently applied to the electrodes associated with the mirror element, and temporal data such as when the connection was first made and when the position of the mirror element was most recently optimized.

Figure 4:
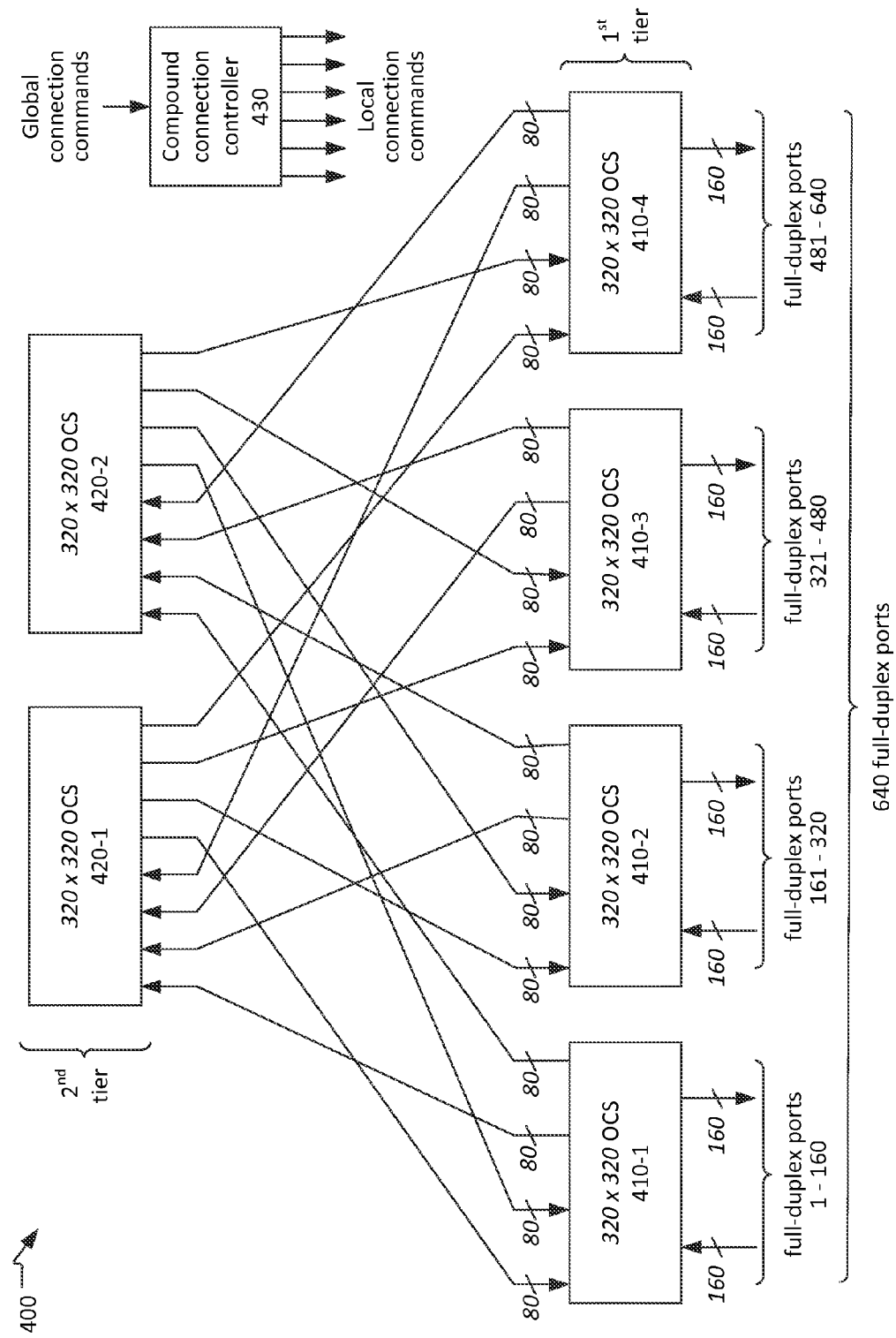
FIG. 4 is a block diagram of a compound optical circuit switch.

Referring now to FIG. 4, an exemplary compound optical circuit switch 400 may be capable of making a unidirectional connection between any of 640 input ports and any of 640 output ports. The 640 input ports and 640 output ports may be grouped in pairs to provide 640 full-duplex ports, as shown in FIG. 4. In this context, a full-duplex port is an input paired with an output to accommodate bidirectional communications. The compound optical circuit switch 400 may be capable of making a bidirectional connection between any one of 640 full-duplex ports to any other of the 640 full duplex ports. In this context, a full-duplex port is an input paired with an output to accommodate bidirectional communications. The compound optical circuit switch 400 may be fully non-blocking, which is to say a bidirectional connection between any two selected full-duplex ports can be made regardless of any possible combination of existing connections between other full-duplex ports.

The compound optical circuit switch 400 may include six optical circuit switches 410-1 to 410-4 and 420-1 to 420-2, each of which may be the optical circuit switch 100. Each of the optical circuit switches 410-1 to 410-4 and 420-1 to 420-2 may be configured to connect a group of 320 inputs to a group of 320 outputs. More specifically, each of the optical circuit switches 410-1 to 410-4 and 420-1 to 420-2 may selectively make up to 320 connections, where each connection conveys an optical signal from an input to an output. The choice of 320 input and outputs per optical circuit switch is exemplary, and the optical circuit switches 410-1 to 410-4 and 420-1 to 420-2 may have more or fewer inputs and outputs.

The six 320×320 optical circuit switches may be arranged as four $1^{st}$-tier switches 410-1, 410-2, 410-3, and 410-4 and two $2^{nd}$-tier switches 420-1, 420-2. The 640 full-duplex ports of the compound optical circuit switch 400 may be connected to respective input/output pairs of the $1^{st}$-tier optical circuit switches 410-1 to 410-4. Specifically 160 inputs and 160 outputs of each $1^{st}$-tier optical circuit switch may be connected respectively to 160 full-duplex ports. For example, the 160 inputs and 160 outputs of optical circuit switch 410-1 may be connected to full-duplex ports numbered from 1 to 160. Similarly, optical circuit switch 410-2 may be connected to full-duplex ports 161 to 320, optical circuit switch 410-3 may be connected to full-duplex ports 321 to 480, and optical circuit switch 410-4 may be connected to full-duplex ports 481 to 640. The full-duplex ports may be numbered in some other manner.

The other inputs and outputs of the $1^{st}$-tier optical circuit switches 410-1 to 410-4 may be connected to the $2^{nd}$-tier optical circuit switches 420-1 and 420-2. Specifically 80 outputs of each of the four $1^{st}$-tier optical circuit switches 410-1 to 410-4 may be connected to respective inputs of each of the $2^{nd}$-tier optical circuit switches 420-1, 420-2. 80 inputs of each of the four $1^{st}$-tier optical circuit switches 410-1 to 410-4 may be connected to respective outputs of each of the $2^{nd}$-tier optical circuit switches 420-1, 420-2.

Figure 5:
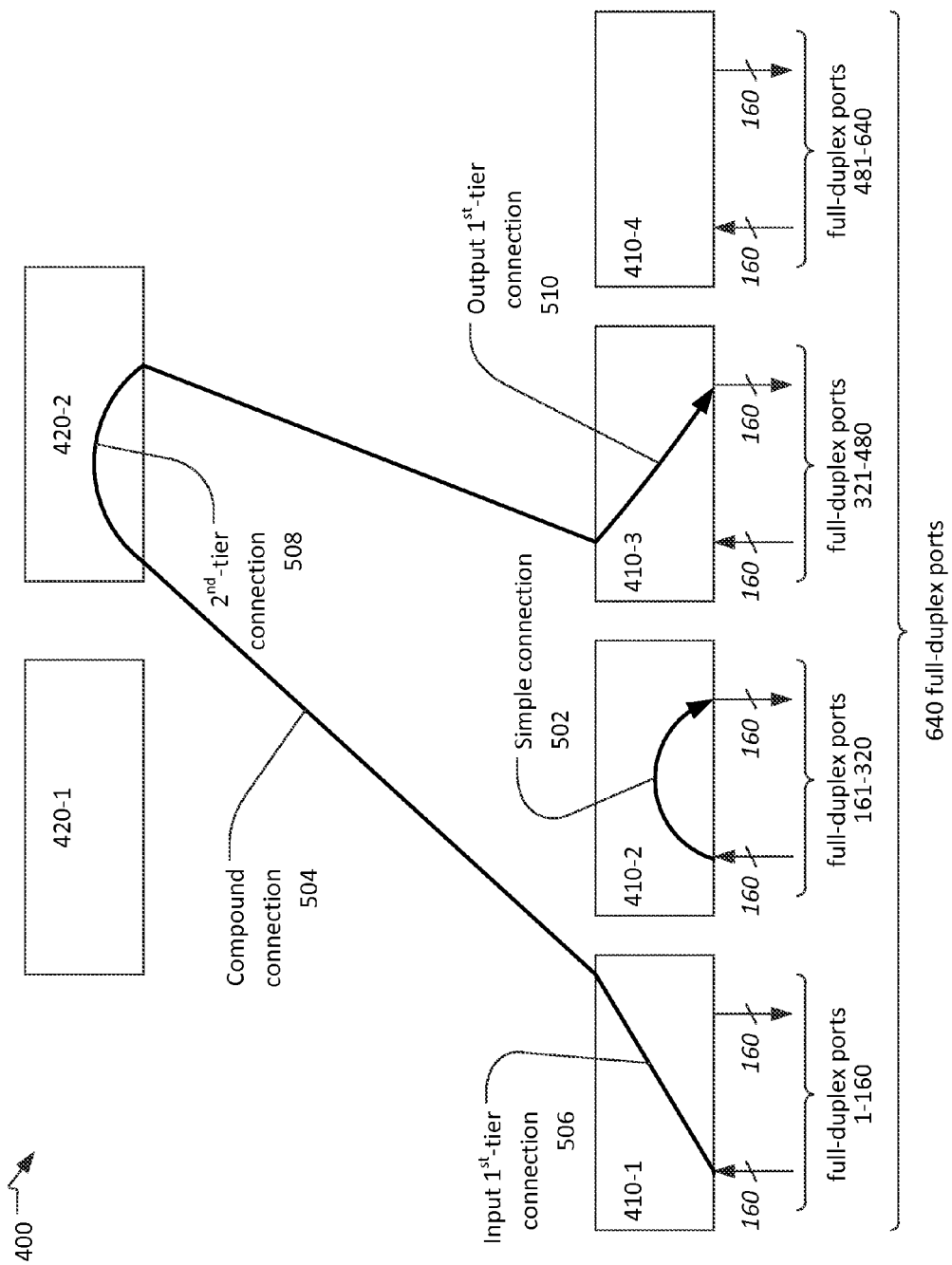
FIG. 5 is a block diagram of the compound optical circuit switch of FIG. 4 illustrating simple and compound connections.

Referring now to FIG. 5, connections between full-duplex ports provided on the same $1^{st}$-tier optical circuit switch may be made within the $1^{st}$-tier optical circuit switch. For example, a connection between two of the full duplex ports 161 to 320 can be made within the $1^{st}$-tier optical circuit switch 410-2, as illustrated by the arrow 502. Such connections will be referred to herein as "simple connections". A special case of a simple connection is when the input and output of a full duplex port are connected to each other to provide an optical loop-back. A loop-back connection may be useful during diagnostic testing of a network.

Connections between full-duplex ports provided by different $1^{st}$-tier optical circuit switches 410-1 to 410-4 may be made via one of the second tier optical circuit switches 420-1 and 420-2, as illustrated by the optical path 504. Such connections will be referred to herein as "compound connections", where "compound" has its normal meaning of "composed of the union of several elements". Each compound connection includes connections through two different $1^{st}$-tier optical circuit switches and a connection through a $2^{nd}$-tier optical circuit switch. These connections will be referred to, in the direction of optical signal flow, an "input $1^{st}$ tier connection" 506, a "$2^{nd}$-tier connection" 508, and an "output $1^{st}$-tier connection" 510. The switches involved in a compound connection will be referred to, in the direction of optical signal flow, the input $1^{st}$-tier switch, the $2^{nd}$-tier switch, and the output $1^{st}$-tier switch.

Referring back to FIG. 4, the compound optical circuit switch 400 may include a compound connection controller 430 having primary responsibility for routing compound connections through compound optical circuit switch. The compound connection controller 430 may receive global connection commands from a network controller such as the network controller 210. In this context, a "global connection command" is a command directed to the compound optical circuit switch 400 as a whole, as opposed to a "local connection command" directed to one n×n optical circuit switch 410-1 to 410-4, 420-1, 420-2 within the compound optical circuit switch 400. Each global connection command may require one or more connections through the compound optical circuit switch 400 to be made and/or broken. When a received global connection command calls for a simple connection to be made or broken, the compound connection controller 430 may relay the global connection command as a local connection command to the appropriate $1^{st}$ tier optical circuit switch 410-1 to 410-4. When a received global connection command calls for a compound connection to be made or broken, the compound connection controller 430 may select a path through the compound optical circuit switch 400 and send individual local connection commands to the appropriate $1^{st}$-tier optical circuit switches 410-1 to 410-4 and the selected and $2^{nd}$-tier optical circuit switch 420-1 or 420-2.

Figure 6:
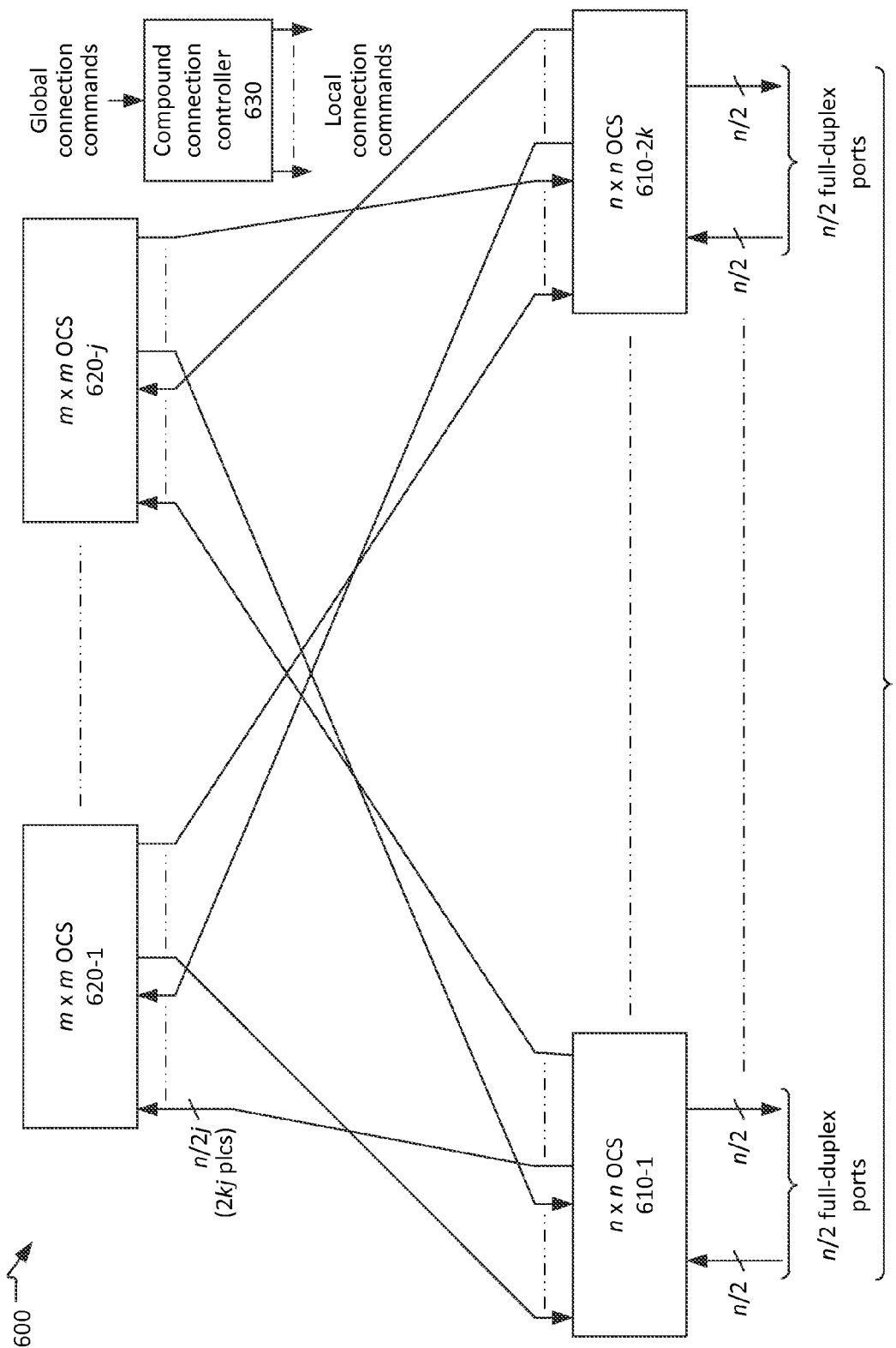
FIG. 6 is a block diagram of another compound optical circuit switch.

Referring now to FIG. 6, a generalized compound optical circuit switch 600 may be capable of making a unidirectional connection between any of kn input ports and any of kn output ports, where n is a number of inputs and outputs provided by an n×n optical circuit switch and k is an integer greater than one. The kn input ports and kn output ports may be grouped in pairs to provide kn full-duplex ports. The compound optical circuit switch 600 may be capable of making a bidirectional connection between any one of the kn full-duplex ports to any other of the kn full duplex ports. The compound optical circuit switch 600 may be fully non-blocking, which is to say a bidirectional connection between any two selected full-duplex ports can be made regardless of any possible combination of existing connections between other full-duplex ports.

The compound optical circuit switch 600 may include 2k n×n $1^{st}$-tier optical circuit switches. Each of the 2k n×n $1^{st}$-tier switches may be configured to connect a group of n inputs to a group of n outputs. Each of the 2k n×n $1^{st}$-tier switches may selectively make up to n connections, where each connection conveys an optical signal from an input to an output. The kn full-duplex ports of the compound optical circuit switch 600 may be connected to respective input/output pairs of the $1^{st}$-tier optical circuit switches 610-1 to 610-2k. Specifically n/2 inputs and n/2 outputs of each $1^{st}$-tier optical circuit switch may be paired to provide n/2 full-duplex ports.

The compound optical circuit switch 600 may include j m×m $2^{nd}$-tier optical circuit switches 620-1 to 620-j. Each of the j m×m $2^{nd}$-tier switches may be configured to connect a group of m inputs to a group of m outputs. Each of the j m×m $2^{nd}$-tier switches may selectively make up to m connections, where each connection conveys an optical signal from an input to an output.

The other inputs and outputs of the $1^{st}$-tier optical circuit switches 610-1 to 610-2k may be connected to the $2^{nd}$-tier optical circuit switches 620-1 and 620-j. Specifically n/2j outputs of each of the 2k $1^{st}$-tier optical circuit switches 610-1 to 610-2k may be connected to respective inputs of each of the $2^{nd}$-tier optical circuit switches 620-1, 620-j. n/2j inputs of each of the 2k $1^{st}$-tier optical circuit switches 610-1 to 610-2k may be connected to respective outputs of each of the $2^{nd}$-tier optical circuit switches 620-1, 620-j. In order for each input or output of a $1^{st}$-tier switch to be connected to a respective output or input of a $2^{nd}$-tier switch, the relationship kn=jm may be satisfied. The compound optical circuit switch 400 of FIG. 4 is an instantiation of the compound optical circuit switch 600 with n=m=320 and k=j=2. In other embodiments of the compound optical circuit switch 600, j, k, m, and n may have other values.

The compound optical circuit switch 600 may include a compound connection controller 630 having primary responsibility for routing compound connections through compound optical circuit switch. The compound connection controller 630 may receive global connection commands from a network controller such as the network controller 210. Each global connection command may require one or more connections through the compound optical circuit switch 600 to be made and/or broken. When a received global connection command calls for a simple connection to be made or broken, the compound connection controller 630 may simply relay the global connection command as a local connection command to the appropriate $1^{st}$ tier optical circuit switch 610-1 to 610-2k. When a received global connection command calls for a compound connection to be made or broken, the compound connection controller 630 may select a path through the compound optical circuit switch 600 and send individual local connection commands to the appropriate $1^{st}$-tier optical circuit switches 610-1 to 610-2k and the selected $2^{nd}$-tier optical circuit switch 620-1 to 620-j.

Briefly reviewing the description of FIG. 1, an optical circuit switch 100 may include tap couplers (of which only tap coupler 114-1 is identified) to direct a sample portion of each input signal to an input power meter 170 that measures an optical power level of each input. The optical circuit switch 100 may also include tap couplers (of which only tap coupler 154-1 is identified) to direct a sample portion of each output signal to an output power meter 180 that measures an optical power level of each output. A switch controller 190 may control the position of mirrors within mirror arrays 130, 140 to optimize each connection through the optical circuit switch 100 based on the respective input and output power measurements.

However, in an compound optical circuit switch such as the compound optical circuit switch 600, every input to a $2^{nd}$-tier switch 620-1 to 620-j comes from an output of one of the $1^{st}$-tier switches 610-1 to 610-2k. Thus, ignoring possible losses in the fiber optic connections between the $1^{st}$-tier and $2^{nd}$-tier switches, the input power levels at the inputs of the $2^{nd}$-tier switches will be the same as the output power levels at the outputs of the $1^{st}$-tier switches. Thus it is not necessary for a compound optical circuit switch to include both output power monitoring in the $1^{st}$-tier switches and input power monitoring in the $2^{nd}$-tier switches. Similarly, every output from a $2^{nd}$-tier switch 620-1 to 620-j goes to an input of one of the $1^{st}$-tier switches 610-1 to 610-2k. Thus it is not necessary for a compound optical circuit switch to include both output power monitoring in the $2^{nd}$-tier switches and input power monitoring in the $1^{st}$-tier switches. Power monitoring in the $1^{st}$-tier switches alone will perform the functions for both the $2^{nd}$-tier and $1^{st}$-tier switches because all connections, both simple and compound, must pass through at least one of the $1^{st}$-tier switches.

Figure 7:
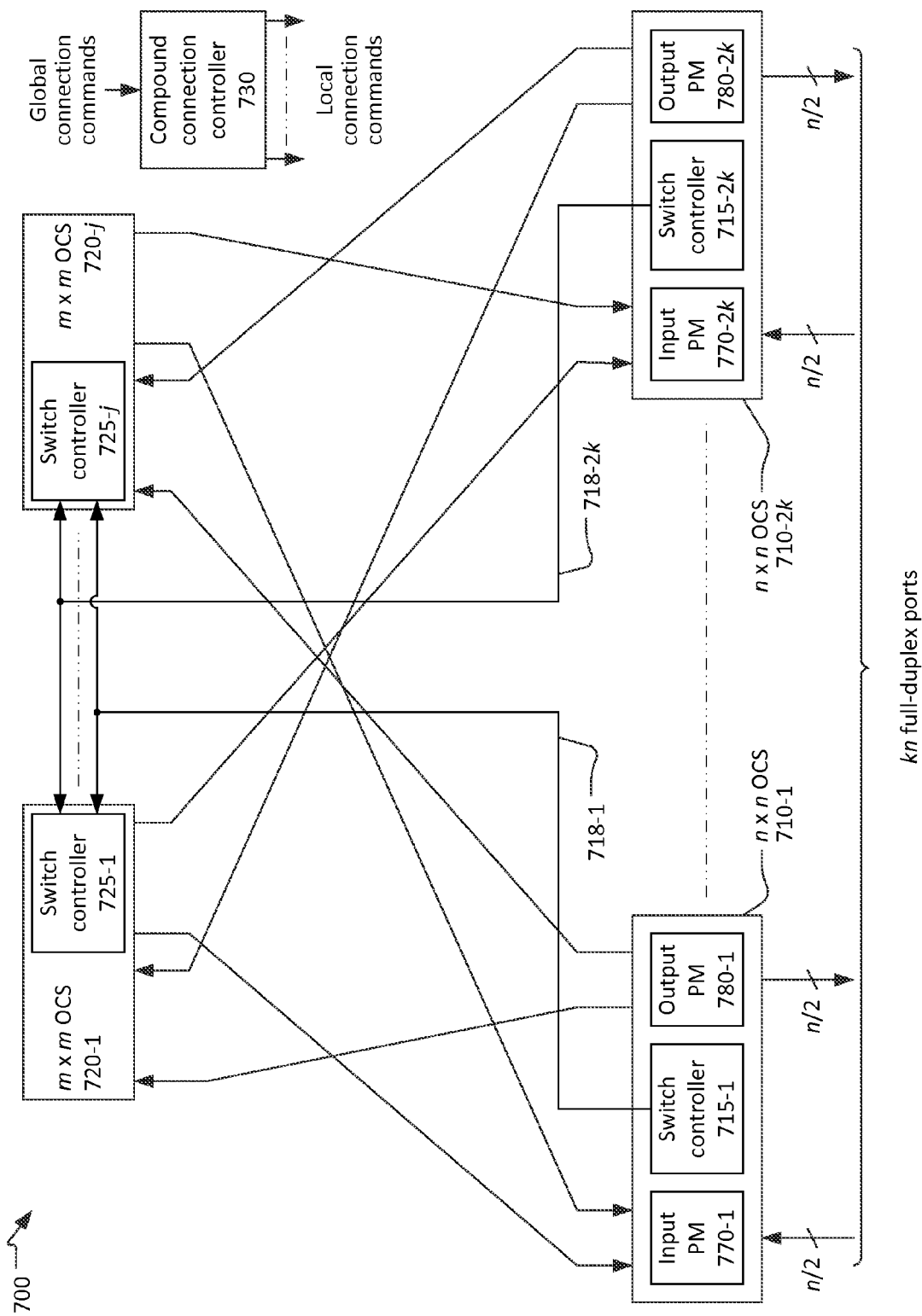
FIG. 7 is a block diagram of another compound optical circuit switch.

Referring now to FIG. 7, another compound optical circuit switch 700 may be capable of making a bidirectional connection between any one of kn full-duplex ports to any other of the kn full duplex ports, where n is a number of inputs and outputs provided by an n×n optical circuit switch and k is an integer greater than zero. The compound optical circuit switch 700 may include 2k first-tier switches 710-1 to 710-2k and j second-tier switches 720-1 to 720-j The $1^{st}$-tier and $2^{nd}$-tier switches may be interconnected as described with respect to FIG. 6. The compound optical circuit switch 700 may include a compound connection controller 730 having primary responsibility for routing compound connections through compound optical circuit switch as previously described.

Each $1^{st}$-tier switch 710-1 to 710-2k may include respective input power meters 770-1 to 770-2k and output power meters 780-1 to 780-2k. As previously described, each input power meter 770-1 to 770-2k may measure the optical power of sample portions extracted from the input signals to the respective $1^{st}$-tier switch. Each output power meter 780-1 to 780-2k may measure the optical power of sample portions extracted from the output signals from the respective $1^{st}$-tier switch.

Every input to one of the $2^{nd}$-tier switches 720-1 to 720-j is provided from an output of one of the $1^{st}$-tier switched 710-1 to 710-2k. Every output from one of the $2^{nd}$-tier switches 720-1 to 720-j is provided to an input of one of the $1^{st}$-tier switched 710-1 to 710-2k. Thus power measurements made at the inputs of the $2^{nd}$-tier switches would be redundant with power measurements at the outputs of the $1^{st}$-tier switches, and power measurements made at the outputs of the $2^{nd}$-tier switches would be redundant with power measurements at the inputs of the $1^{st}$-tier switches.

The $2^{nd}$-tier switches 720-1 to 720-j may not extract sample portions from the respective input and output signals, and may not include input or output power meters. Instead, the respective switch controllers 725-1 to 725-j of the $2^{nd}$-tier switches may receive power measurement data 718-1 to 718-2k from the respective switch controllers 715-1 to 715-2k of the $1^{st}$ tier switches. Power measurement data 718-1 to 718-2k may be communicated from the $1^{st}$-tier switches to the $2^{nd}$-tier switches via multiple dedicated connections (as shown) or via one or more shared bus or network. For example, the $1^{st}$-tier switches 710-1 to 710-2k may transmit power measurement data in rotation over a shared bus or network. Each $1^{st}$-tier switch may transmit power measurement data for all inputs and outputs, or only those inputs and outputs connected to one of the $2^{nd}$-tier switches 720-1 to 720-j. Each $2^{nd}$-tier switch (or the switch controllers 725-1 to 725-j or the compound connection controller 730) may have knowledge of the interconnections between the $1^{st}$-tier switches and each $2^{nd}$-tier switch such that each $2^{nd}$-tier switch may only capture power measurement data for the $1^{st}$-tier inputs and outputs to which it is actually connected.

Figure 8:
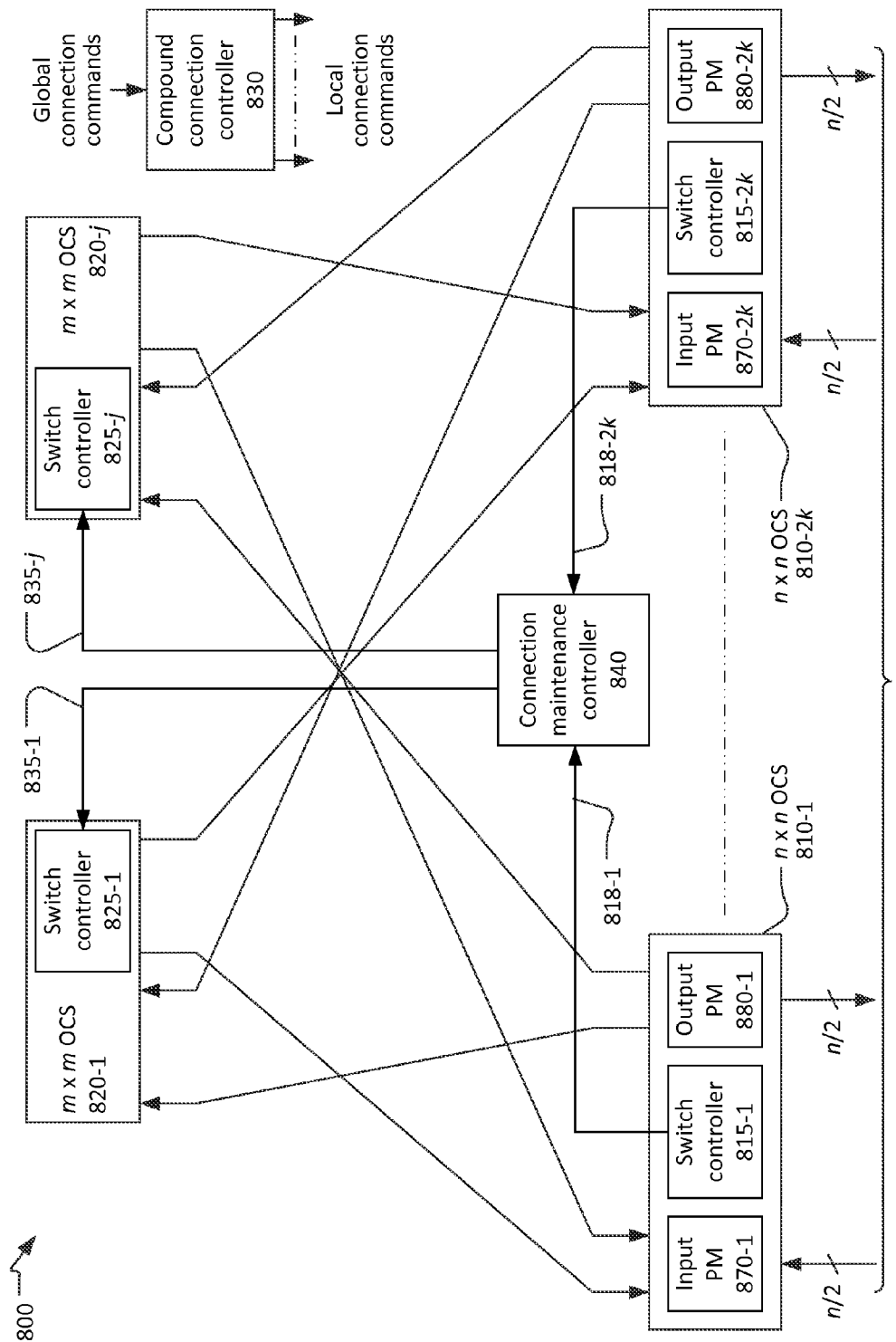
FIG. 8 is a block diagram of another compound optical circuit switch.

Referring now to FIG. 8, another compound optical circuit switch 800 may be capable of making a bidirectional connection between any one of kn full-duplex ports to any other of the kn full duplex ports, where n is a number of inputs and outputs provided by an n×n optical circuit switch and k is an integer greater than zero. The compound optical circuit switch 800 may include 2k first-tier switches 810-1 to 810-2k and $j$ second-tier switches 820-1 to 820-$k$. The $1^{st}$-tier and $2^{nd}$-tier switches may be interconnected as described with respect to FIG. 6. The compound optical circuit switch 800 may include a compound connection controller 830 having primary responsibility for routing compound connections through compound optical circuit switch as previously described.

Each $1^{st}$-tier switch 810-1 to 810-2$k$ may include respective input power meters 870-1 to 870-2$k$ and output power meters 880-1 to 880-2$k$. As previously described, each input power meter 870-1 to 870-2$k$ may measure the optical power of sample portions extracted from the input signals to the respective $1^{st}$-tier switch. Each output power meter 880-1 to 880-2$k$ may measure the optical power of sample portions extracted from the output signals from the respective $1^{st}$-tier switch.

Each $2^{nd}$-tier switch 820-1 to 820-$j$ may not extract sample portions from input and output signals and may not include input or output power meters. Instead, the respective switch controllers 815-1 to 815-2$k$ of the $1^{st}$-tier switches may provide power measurement data 818-1 to 818-2$k$ to a connection maintenance controller 840. The connection maintenance controller 840 may be a separate computing device, or may be integrated with the compound connection controller 830 or one of the switch controllers 815-1 to 815-2$k$ or 825-1 to 825-$j$. The connection maintenance controller 840 may control the maintenance and optimization of connections through the optical circuit switch. Power measurement data 818-1 to 818-2$k$ may be communicated from the $1^{st}$-tier switches to the connection maintenance controller 840 via multiple dedicated connections (as shown) or via one or more shared bus or network. The connection maintenance controller 840 may be knowledgeable of the interconnections between the $1^{st}$-tier and $2^{nd}$-tier switches. The connection maintenance controller 840 may distribute the appropriate power measurement data 835-1 to 835-$j$ to each $2^{nd}$-tier switch 820-1 to 820-$j$. The connection maintenance controller 840 may also coordinate optimization of compound connections between the $1^{st}$-tier and $2^{nd}$-tier switches.

Description of Processes

Figure 9:
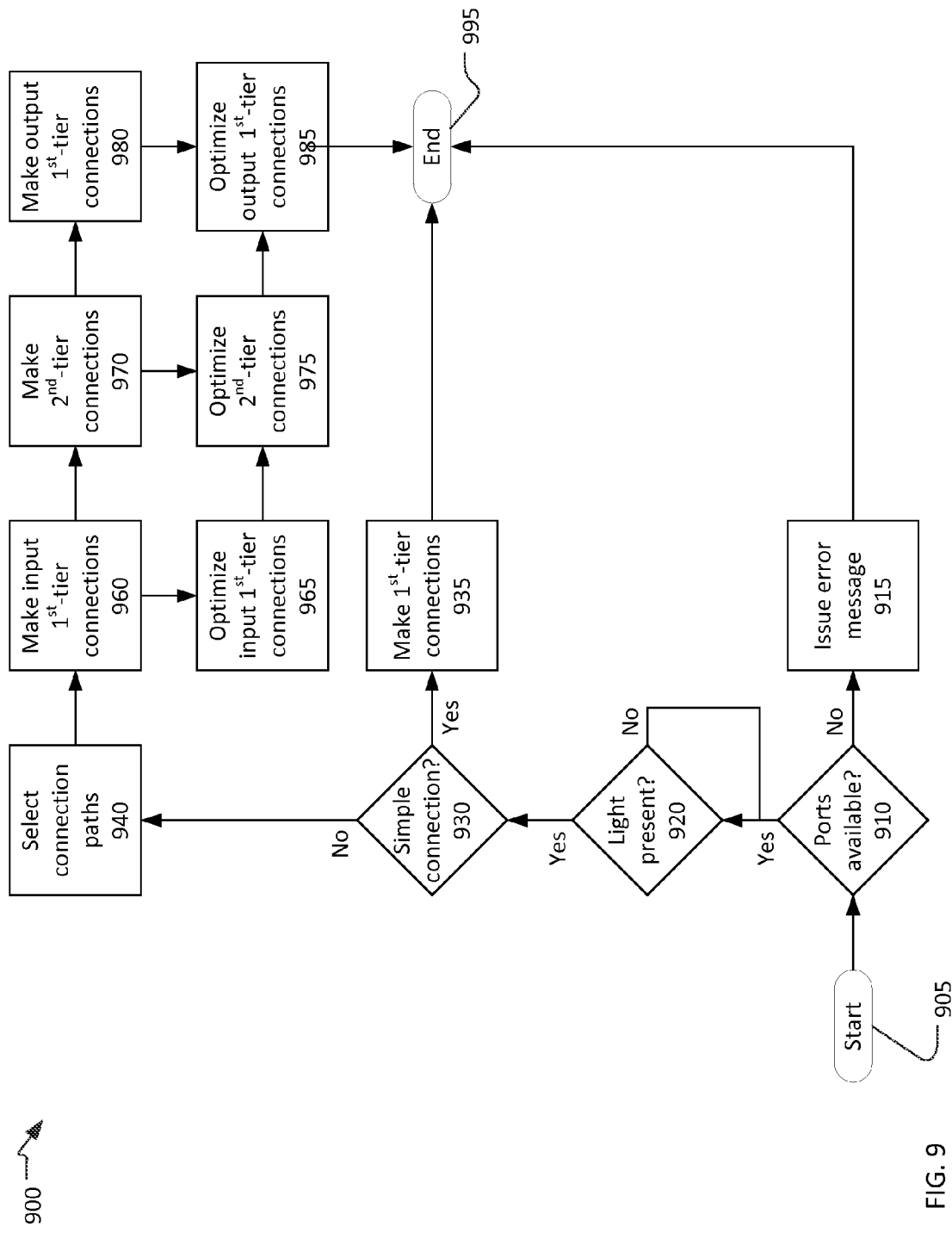
FIG. 9 is a flow chart of a process for making a connection through a compound optical circuit switch.

FIG. 9 is a flow chart of a process 900 for making a full-duplex connection through a compound optical circuit switch, such as the compound optical circuit switches 400, 600, 700, and 800. The process 900 may start at 905 when a command to make a connection between to designated ports is received by the compound optical circuit switch. The command may be received, for example, from a network controller such as the network controller 210. The process 900 may end at 995 after a single full-duplex (bidirectional) connection has been made. The process 900 may be repeated each time a new connection is made through the compound optical circuit switch.

At 910, a determination may be made whether or not the two ports to be connected are available, which is to say the two ports to be connected are not already used in a prior connection. If one or both of the two ports is used in an existing connection and thus not available ("no" at 910), an error message may be issued to the network controller at 920 and the process 900 may end at 995. If a determination is made that the two ports are available ("yes" at 910), the process 900 may proceed to 920. The actions at 910 and 915 are optional and in some compound optical circuit switches, the process 900 may proceed immediate to 920 from the start at 905.

At 920, a determination may be made whether or not light is present at the input port to be used in the connection. When light is not present ("no" at 920) at the input port, the process 900 may idle at 920 until light is provided. When light is present ("yes" at 920) at the input port, the process 900 may proceed to 930.

At 930, a determination may be made whether or not the connection to be optimized is a simple connection. When the connection to be optimized is a simple connection ("yes" at 930), the connection can be made through a single $1^{st}$-tier switch. In this case, the connection may be made through the appropriate $1^{st}$-tier switch at 935 and the process 900 may end at 995.

When a determination is made at 930 that the connection is not a simple connection ("no" at 930), the connection must be, by default, a compound connection through two $1^{st}$-tier switches and a $2^{nd}$-tier switch. In this case, connection paths for each direction of the full-duplex connection may be selected from among the available paths at 940. For example, when the first connection made though the compound optical circuit switch 400 is a compound connection, 80 different paths will be available from the input 1st-tier switch to either of the $2^{nd}$-tier switches, and 80 different paths will be available from the selected $2^{nd}$-tier switch to the output $1^{st}$-tier switch, for a total of 2×80×80=12,800 different possible routings for the connection. At the other extreme, after 639 connections have been made, only a single connection path will be available for the $640^{th}$ connection.

Particular connection paths for each direction of the full-duplex connection may be selected from among the available paths at 940 randomly, or in a predetermined order, or based on one or more selection criteria. The bidirectional paths of a full-duplex connection may commonly, but not necessarily be routed through the same $2^{nd}$-tier switch. For example, a preferred $2^{nd}$-tier switch may be specified in the command received at 905. The various $1^{st}$-tier and $2^{nd}$-tier switches making up a compound optical circuit switch are not necessarily co-located. The $1^{st}$-tier and $2^{nd}$-tier switches of a compound optical circuit switch may be physically distributed between multiple equipment racks, multiple buildings, and even multiple cities. When the $1^{st}$-tier and $2^{nd}$-tier switches of a compound optical circuit switch are physically distributed, a selection criteria applied at 940 may be to minimize the physical distance of the paths. Minimizing the physical distance of the paths may, for example, lower the probability of the connection being lost due to a cable failure. Different physical and logical security levels may be imposed on different $1^{st}$-tier and $2^{nd}$-tier switches making up a compound optical circuit switch. In this case, a selection criteria applied at 940 may be to ensure a particular security level as defined in the command received at 905. Other criteria may be used at 940 to select particular paths from a plurality of available paths. When multiple selection criteria are applied to a full duplex connection, priorities or weights may be assigned to the selection criteria.

After the connections paths have been selected at 940, the input $1^{st}$ tier switch may be instructed to make the input $1^{st}$-tier connections at 960. Making a connection in an optical circuit switch may require an extended period of time (for example tens or hundreds of milliseconds) since the mirror elements may be moved gradually to avoid mechanical overshoot, ringing, and possible damage. Making the input $1^{st}$-tier connections at 960 allows the input $1^{st}$-tier connections be optimized at 965 (assuming light is present at the inputs to the connections) without having to wait for the movement of the mirrors in the $2^{nd}$-tier switch and the output $1^{st}$-tier switch. The $2^{nd}$-tier connections may be made at 970, concurrent with the optimization of the input $1^{st}$-tier connection at 965. The $2^{nd}$-tier connections may be optimized at 975 after the optimization of the input $1^{st}$-tier connections at 965 is complete.

The output $1^{st}$-tier connections may be made last at 980, which may be concurrent with the optimization of the input $1^{st}$-tier connection at 965 or optimization of the $2^{nd}$-tier connection at 975. The output $1^{st}$-tier connections may be optimized at 985 after the optimization of the $2^{nd}$-tier connections at 975 is complete. The process 900 may then end at 995.

Portions of the process 900 may be performed and/or supervised by a compound connection controller such as the compound connection controllers 430, 630, 730 and 830. The compound connection controller may receive connection commands at 905, determine if the ports are available at 900 and issue error messages at 905. When a simple connection is made, the compound connection controller may relay the connection command to the appropriate $1^{st}$-tier switch to make the connection at 935. When a compound connection is made, the compound connection controller may select the connection path at 930 and provide local commands to the appropriate $1^{st}$-tier and $2^{nd}$-tier switches to make the connection at 960-985.

Figure 10:
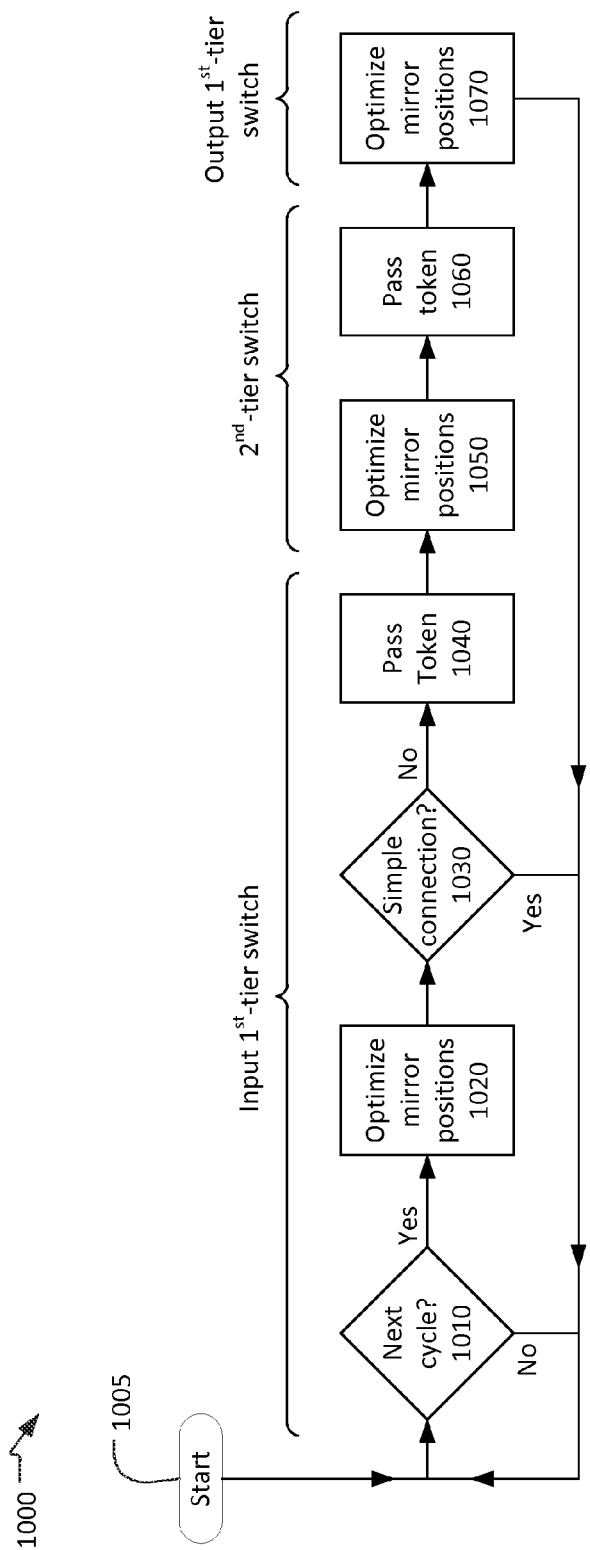
FIG. 10 is a flow chart of a process for optimizing a connection through a compound optical circuit switch.

FIG. 10 is a flow chart of a process 1000 for optimizing a connection through a compound optical circuit switch that does not include a connection maintenance controller, such as the compound optical circuit switches 400, 600, and 700. A similar process, omitting actions at 1040 and 1060, may be used for optimizing a connection through a compound optical circuit switch that does include a connection maintenance controller, such as the compound optical circuit switch 800. The process 1000 may start at 1005 when a first connection is made through the compound optical circuit switch and may continue perpetually so long as the compound optical circuit switch is in service. The process 1000 is inherently cyclic, and will repeat periodically to re-optimize the connection to correct for factors such as mirror element drift and/or temperature changes.

Multiple instantiations of the process 1000 may proceed sequentially and/or concurrently to optimize a large number of connections through the compound optical circuit switch. Note that two instantiations of the process 1000 are required to optimize both directions of a full-duplex simple connection. For example, the compound optical circuit switch 400 of FIG. 4 can provide 320 full-duplex connections between pairs of full-duplex ports, which is equivalent to 640 unidirectional connections between individual inputs and outputs. The compound optical circuit switch 400 may run up to 640 instantiations of the process 1000 to optimize all connections. The compound optical circuit switches 600 and 700 may run up to kn instantiations of the process 1000.

As shown in FIG. 10, the process 1000 is controlled by the input $1^{st}$-tier switch for each connection. An alternate version of the process 1000 may be controlled by the output $1^{st}$-tier switch of each connection. In a compound optical circuit switch including a connection maintenance controller, such as the compound optical circuit switch 800, the process for optimizing connections may be controlled by the connection maintenance controller.

At 1010, the input $1^{st}$-tier switch may determine whether or not it is time to start a next optimization cycle. This determination may be based, for example, by a hardware or software timer that initiates an optimization cycle at periodic intervals. It the determination is made that it is not yet time to begin a new cycle ("no" at 1010) the process 1000 may idle at 1010.

When a determination is made at 1010 to initiate a new optimization cycle, the positions of mirrors within the input $1^{st}$-tier switch may be optimized at 1020 using a local search optimization technique. For example, a hill climbing algorithm or other local search algorithm may be used to optimize the mirror position. A mirror position may be incrementally changed and a determination may be made if the position change improved or degraded the insertion loss of the connection through the switch. Successive incremental changes may be made until an optimum mirror position is determined. Sequential hill-climbing algorithms may be performed for each of two rotation axes and two mirror elements for each connection.

After the positions of both mirror elements on both axes have been optimized at 1020, a determination may be made at 1030 whether or not the connection is a simple connection. When the connection is a simple connection ("yes" at 1030), the connection is completed within the input $1^{st}$-tier switch (which is inherently also the output $1^{st}$-tier switch). Thus the optimization performed at 1020 optimizes the entire simple connection. In this case, the process 1000 may return to 1010 to await the start of the next cycle.

When a determination is made at 1030 that the connection is not a simple connection ("no" at 1030), the connection must be, by default, a compound connection through two $1^{st}$-tier switches and a $2^{nd}$-tier switch. In this case, at 1040, the input $1^{st}$-tier switch may pass a token to the appropriate $2^{nd}$-tier switch. The token may be passed, for example, using the same bus, network, or other communications path.

Upon receipt of the token, the $2^{nd}$-tier switch may optimize the positions of the appropriate mirrors at 1050. When complete, the $2^{nd}$-tier switch may pass the token to the appropriate output $1^{st}$ tier switch at 1060. Upon receipt of the token, the output $1^{st}$-tier switch may optimize the positions of the appropriate mirrors at 1070 to complete the optimization of the entire compound connection. The process 1005 may then return to 1010 to await the next optimization cycle.

Figure 11:
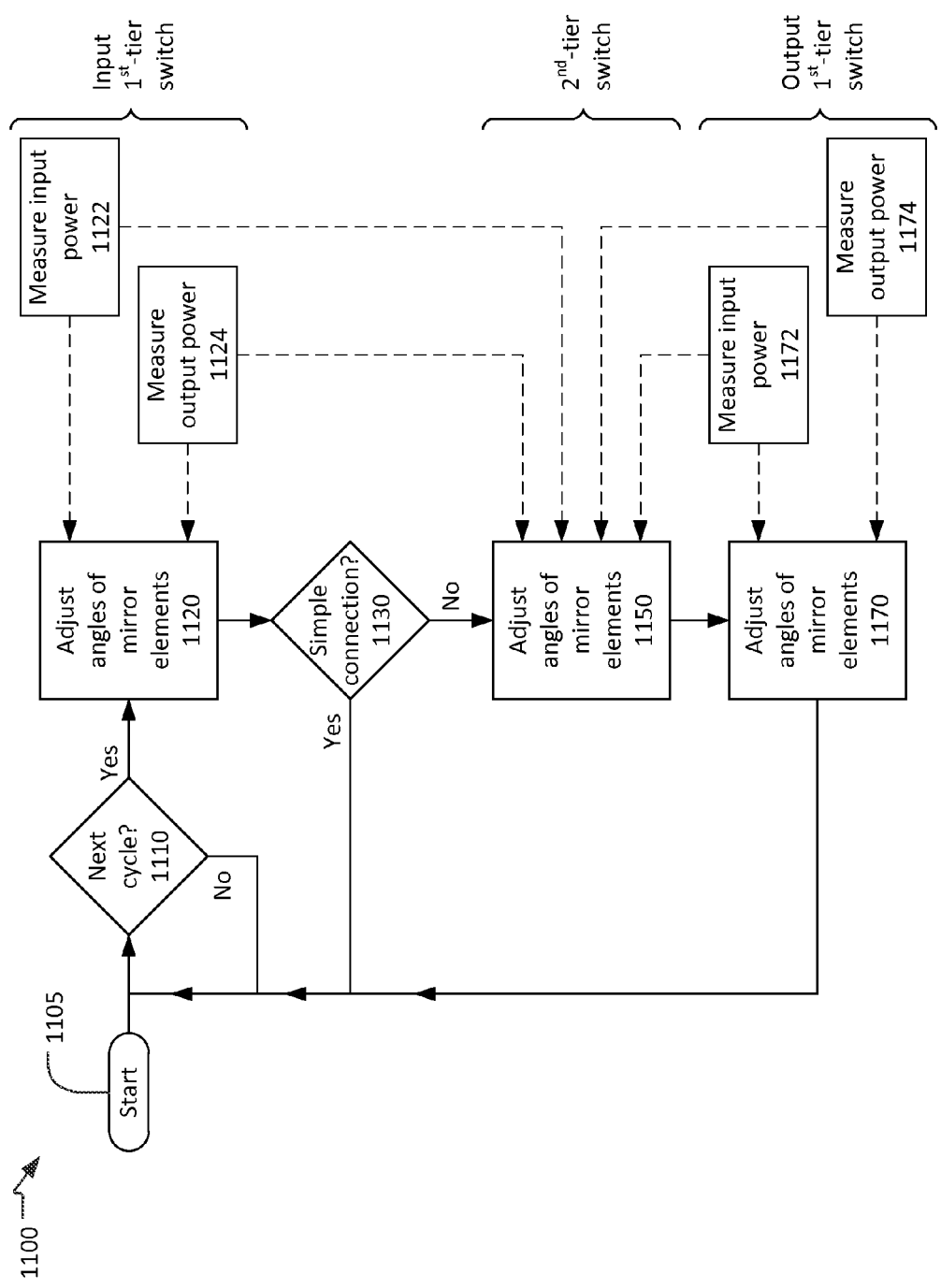
FIG. 11 is a flow chart of another process for optimizing a connection through a compound optical circuit switch.

FIG. 11 is a flow chart of a process 1100 for optimizing a half duplex (unidirectional) connection through a compound optical circuit switch that shares optical power measurements between $1^{st}$-tier and $2^{nd}$-tier switches, such as the compound optical circuit switches 700 or 800. The process 1100 may start at 1105 when a connection is first made through the compound optical circuit switch and may continue perpetually so long as the connection is maintained. The process 1100 is inherently cyclic, and will repeat periodically to re-optimize the connection to correct for factors such as mirror element drift and/or temperature changes.

Multiple instantiations of the process 1100 may proceed sequentially and/or concurrently to optimize a large number of connections through the compound optical circuit switch. Note that two instantiations of the process 1100 are required to optimize both directions of a full-duplex connection. The compound optical circuit switches 700 and 800 may run up to kn instantiations of the process 1100.

The process 1100 may be controlled by a connection maintenance controller such as the connection maintenance controller 840 in the compound optical circuit switch 800. An alternate version of the process 1100 may be controlled by one of the $1^{st}$-tier switched, in which tokens must be passed between the $1^{st}$-tier and $2^{nd}$ tier switches as shown in FIG. 10.

At 1110, the connection maintenance controller (or the responsible $1^{st}$-tier switch) may determine whether or not it is time to start a next optimization cycle. This determination may be based, for example, by a hardware or software timer that initiates an optimization cycle at periodic intervals. It the determination is made that it is not yet time to begin a new cycle ("no" at 1110) the process 1100 may idle at 1110.

When a determination is made at 1110 to initiate a new optimization cycle, the positions of mirrors within the input $1^{st}$-tier switch may be optimized at 1120 based on input power and output power measurements performed at 1122 and 1124 respectively. The input and output power measurements may be performed by an input power meter and an output power meter, respectively, within the input $1^{st}$ tier switch. The positions of mirrors within the input $1^{st}$-tier switch may be optimized at 1120 using a local search optimization technique. For example, a hill climbing algorithm or other local search algorithm may be used to optimize the mirror position. A mirror position may be incrementally changed and a determination may be made if the position change improved or degraded the insertion loss of the connection through the switch. Successive incremental changes may be made until an optimum mirror position is determined. Sequential hill-climbing algorithms may be performed for each of two rotation axes and two mirror elements for each connection.

After the positions of both mirror elements on both axes have been optimized at 1120, a determination may be made at 1130 whether or not the connection is a simple connection. When the connection is a simple connection ("yes" at 1130), the process 1100 may return to 1110 to await the start of the next cycle.

When a determination is made at 1130 that the connection is not a simple connection ("no" at 1130), the connection must be, by default, a compound connection through two $1^{st}$-tier switches and a $2^{nd}$-tier switch. In this case, the positions of the appropriate mirrors in the $2^{nd}$-tier switch may be optimized at 1050. Optimization of the positions of the mirrors in the $2^{nd}$-tier switch may be based on power measurements performed at 1122 and 1124 within the input $1^{st}$-tier switch and power measurements performed at 1172 and 1174 within the output $1^{st}$-tier switch.

After the positions of the mirrors in the $2^{nd}$-ter switch have been optimized, the output $1^{st}$-tier switch may optimize the positions of the appropriate mirrors at 1170 to complete the optimization of the entire compound connection. The positions of the mirrors in the output $1^{st}$-tier switch may be optimized at 1170 based on input power and output power measurements performed at 1172 and 1174 respectively. The input and output power measurements may be performed by an input power meter and an output power meter, respectively, within the output $1^{st}$ tier switch. After the positions of the mirrors in the output $1^{st}$-ter switch have been optimized, the process 1105 may return to 1110 to await the next optimization cycle.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plural" and "plurality" mean two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A compound optical circuit switch, comprising:
   two or more $1^{st}$-tier switches, each $1^{st}$-tier switch including one or more power meters to measure optical powers of signals received at inputs to the $1^{st}$-tier switch and signals output from outputs of the $1^{st}$-tier switch; and
   a $2^{nd}$-tier switch having plural inputs optically connected to respective $1^{st}$-tier switch outputs and plural outputs optically connected to respective $1^{st}$-tier switch inputs, wherein
   the $2^{nd}$-tier switch does not contain a power meter, and
   positions of rotatable mirror elements used to make selectable optical connections from the inputs of the $2^{nd}$-tier switch to the outputs of the $2^{nd}$-tier switch are controlled based on optical power measurement data from the power meters within the two or more $1^{st}$-tier switches.

2. The compound optical circuit switch of claim 1, wherein positions of rotatable mirror elements used to make selectable optical connections from inputs to outputs within each of the two or more $1^{st}$-tier switches are controlled based on optical power measurement data from the respective power meters.

3. A compound optical circuit switch to provide selectable optical connections between a plurality of input ports and a plurality of output ports, comprising:
   two or more $1^{st}$-tier switches, each $1^{st}$-tier switch configured to make selectable optical connections between a plurality of $1^{st}$-tier inputs and a plurality of $1^{st}$-tier outputs, each $1^{st}$-tier switch comprising:
      an input power meter to measure optical powers of signals received at the $1^{st}$-tier inputs, and
      an output power meter to measure optical powers of signals output from the $1^{st}$-tier outputs; and
   at least one $2^{nd}$-tier switch, each $2^{nd}$ tier switch comprising:
      plural $2^{nd}$-tier inputs optically connected to respective $1^{st}$-tier outputs,
      plural $2^{nd}$-tier outputs optically connected to respective $1^{st}$-tier inputs,
      plural $2^{nd}$-tier rotatable mirror elements configured to make selectable optical connections from the $2^{nd}$-tier inputs to the $2^{nd}$-tier outputs, and
      a $2^{nd}$-tier switch controller configured to control positions of at least some of the 2nd-tier rotatable mirror elements based on optical power measurement data from the input power meters and the output power meters of the $1^{st}$-tier switches.

4. The compound optical circuit switch of claim 3, wherein each $2^{nd}$-tier switch controller is configured to control positions of the at least some of the $2^{nd}$-tier rotatable mirror element to minimize insertion loss of connections from the $2^{nd}$-tier inputs to the $2^{nd}$-tier outputs.

5. The compound optical circuit switch of claim 3, wherein each of the plurality of input ports is connected to a respective $1^{st}$-tier input of one of the two or more $1^{st}$-tier switches, and
   each of the plurality of output ports is connected to a respective $1^{st}$-tier output of one of the two or more $1^{st}$-tier switches.

6. The compound optical circuit switch of claim 3, wherein each $1^{st}$-tier switch further comprises:
- plural $1^{st}$-tier rotatable mirror elements configured to make selectable optical connections from the $1^{st}$-tier inputs to the $1^{st}$-tier outputs, and
- a $1^{st}$-tier switch controller configured to control positions of at least some of the $1^{st}$-tier rotatable mirror elements based on optical power measurement data from the input power meter and the output power meter.

7. The compound optical circuit switch of claim 6, wherein each $1^{st}$-tier switch controller is configured to control positions of the at least some of the $1^{st}$-tier rotatable mirror element to minimize insertion loss of connections from the $1^{st}$-tier inputs to the $1^{st}$-tier outputs.

8. The compound optical circuit switch of claim 6, wherein each $1^{st}$-tier switch controller is configured to provide optical power measurement data to each of the $2^{nd}$-tier switch controllers.

9. The compound optical circuit switch of claim 6, further comprising:
- a connection maintenance controller coupled to the $1^{st}$-tier switch controllers and the $2^{nd}$-tier switch controllers, the connection maintenance controller configured to control optimization of connections made through the compound optical circuit switch.

10. The compound optical circuit switch of claim 7, wherein
- each $1^{st}$-tier switch controller is configured to provide optical power measurement data to the connection maintenance controller, and
- the connection maintenance controller is configured to provide selected optical power measurement data to each $2^{nd}$-tier switch controller.

11. A method of making a connection from an input port to an output port of a compound optical circuit switch, the input port connected to an input of a first $1^{st}$-tier switch and the output port connected to an output of a second $1^{st}$-tier switch, the method comprising:
- selecting a output of the first $1^{st}$-tier switch connected to an input of a $2^{nd}$-tier switch;
- selecting an output of the $2^{nd}$-tier switch connected to an input of the second $1^{st}$-tier switch;
- making a first connection from the input to the selected output of the first $1^{st}$-tier switch;
- optimizing the first connection;
- after making the first connection, making a second connection from the input of the $2^{nd}$-tier switch to the selected output of the $2^{nd}$-tier switch;
- after optimizing the first connection, optimizing the second connection;
- after making the second connection, making a third connection from the input of the second $1^{st}$-tier switch to the output of the second $1^{st}$-tier switch;
- after optimizing the second connection, optimizing the third connection.

12. The method of claim 11, wherein
making the second connection comprises rotating one or more rotatable mirror elements with the $2^{nd}$-tier switch to provide an optical path from the input to the $2^{nd}$-tier switch to the selected output of the $2^{nd}$-tier switch, and
optimizing the second connection comprises controlling positions of the one or more rotatable mirror elements with the $2^{nd}$-tier switch based on optical power measurements made by power meters within the first and second $1^{st}$-tier switches.

13. The method of claim 12, wherein
optimizing the second connection comprises controlling positions of the one or more rotatable mirror elements with the $2^{nd}$-tier switch based on a measurement of the power at the selected output of the first $1^{st}$-tier switch and a measurement of the power at the input of the second $1^{st}$-tier switch.

14. The method of claim 12, wherein
making the first connection comprises rotating one or more rotatable mirror elements within the first $1^{st}$-tier switch to provide an optical path from the input of the first $1^{st}$-tier switch to the selected output of the first $1^{st}$-tier switch, and
optimizing the first connection comprises controlling positions of the one or more rotatable mirror elements within the first $1^{st}$-tier switch based on optical power measurements made by the power meter within the first $1^{st}$-tier switch.

15. The method of claim 12, wherein
making the third connection comprises rotating one or more rotatable mirror elements with the second $1^{st}$-tier switch to provide an optical path from the input of the second $1^{st}$-tier switch to the output of the second $1^{st}$-tier switch, and
optimizing the third connection comprises controlling positions of the one or more rotatable mirror elements within the second $1^{st}$-tier switch based on optical power measurements made by the power meter within the second $1^{st}$-tier switch.

16. A method of maintaining connections through a compound optical circuit switch, each connection along a respective path starting at an input port, passing through a first one of two or more $1^{st}$-tier switches, a selected one of one or more $2^{nd}$-tier switches, and a second one of the two or more $1^{st}$-tier switches, and ending at an output port, the method comprising:
- measuring optical power at inputs and outputs of each of the two or more $1^{st}$-tier switches using one or more power meters within each $1^{st}$-tier switch; and
- optimizing positions of one or more rotatable mirror elements within each of the one or more $2^{nd}$-tier switches based on power measurement data provided by the power meters within the $1^{st}$-tier switches.

17. The method of claim 16 further comprising:
optimizing positions of one or more rotatable mirror elements within each of the two or more $1^{st}$-tier switches based on power measurement data provided by the one or more power meter within each $1^{st}$-tier switch.

18. The method of claim 17, wherein, for each connection:
optimizing positions of the one or more rotatable mirror elements in the first one of the two or more $1^{st}$-tier switches is performed before optimizing positions of the one or more rotatable mirror elements within the selected $2^{nd}$-tier switch, and
optimizing positions of the one or more rotatable mirror elements in the second one of the two or more $1^{st}$-tier switches is performed after optimizing positions of the one or more rotatable mirror elements within the selected $2^{nd}$-tier switch.

19. The method of claim 18, wherein, for each connection:
optimizing positions of the one or more rotatable mirror elements in the first one of the two or more $1^{st}$-tier switches, optimizing positions of the one or more rotatable mirror elements within the selected $2^{nd}$-tier switches, and optimizing positions of the one or more rotatable mirror elements in the second one of the two or more $1^{st}$-tier switches are repeated periodically.

* * * * *